United States Patent [19]

Rabier et al.

[11] Patent Number: 5,373,224
[45] Date of Patent: Dec. 13, 1994

[54] METHOD AND APPARATUS FOR VARYING THE POWER IN A LOAD CONNECTED TO THE MAINS

[75] Inventors: Philippe Rabier, Joue-les-Tours; Laurent Perier, Aix en Provence, both of France

[73] Assignee: SGS-Thomson Microelectronics, S.A., Gentilly, France

[21] Appl. No.: 37,020

[22] Filed: Mar. 25, 1993

[30] Foreign Application Priority Data

Mar. 27, 1992 [FR] France ................. 92 04131

[51] Int. Cl.$^5$ ............................................. G05F 1/455
[52] U.S. Cl. ................................... 323/244; 323/237; 323/320; 327/457; 327/447
[58] Field of Search ............... 323/237, 239, 241, 242, 323/244, 246, 320, 322, 323, 324, 326; 307/632, 646

[56] References Cited

U.S. PATENT DOCUMENTS 4,771,224  9/1988  Elms ................. 323/244 X
5,159,657 10/1992  Runggaldier et al. ........ 323/241 X

FOREIGN PATENT DOCUMENTS 0381789  8/1990  European Pat. Off. .

*Primary Examiner*—Steven L. Stephan
*Assistant Examiner*—Y. Jessica Han
*Attorney, Agent, or Firm*—Wolf, Greenfield & Sacks

[57] ABSTRACT

A method for regulating the power in a load connected to the mains through a controlled switch and a device for implementing the method. The method includes the following steps: detecting a mains synchronization pulse, which determines the start of a cycle, within a fixed time interval of the preceding cycle; as soon as the pulse has been detected, waiting for the end of the fixed interval, then counting down a first time interval that substantially corresponds to a selected time interval; at the end of the first time interval, triggering the switch on and counting down a second time interval that ends before the normal arrival of the next synchronization pulse; and at the end of the second time interval, counting down the fixed time interval within which the next synchronization pulse must be detected.

20 Claims, 2 Drawing Sheets

METHOD AND APPARATUS FOR VARYING THE POWER IN A LOAD CONNECTED TO THE MAINS

BACKGROUND OF THE INVENTION

1. Field of the Invention

The present invention relates to power regulators including a controllable switch such as a triac, for loads connected to the mains, and more particularly such regulators in which the power variation is accomplished by switching the load to the mains during variable portions of each half-period of the mains.

2. Discussion of the Related Art

FIG. 1 is a simplified diagram of a power regulator. A load L is connected to the mains through a triac S. The triggering of triac S is delayed with respect to the zero crossings of the mains voltage due to a delay circuit including a variable resistor R and a capacitor C, both connected in series with load L to the mains. A diac D connects the gate of triac S to the common junction between resistor R and capacitor C. Thus, depending on the value of resistor R, triac S is triggered at each half-period with a more or less high delay with respect to the zero crossings of the mains voltage.

This circuit is advantageous in that it is simple and rather insensitive to mains voltage perturbations. Indeed, the combination of resistor R and capacitor C forms a low-pass filter preventing parasitic pulses that could unduly trigger triac S. This type of circuit is often used instead of the domestic light switches. However, this circuit does not withstand inductive charges in a satisfactory manner.

Presently, more complex power regulating circuits are available. These circuits operate better under inductive charges and offer numerous improvements, such as smooth triggering due to a sensitive control key which, depending on the time duration during which it is touched, establishes, interrupts or varies the power in the load.

These power regulators generally use specific integrated circuits that are provided in analog technology and require a large number of large-size external components, such as capacitors for filtering parasitic pulses from the mains, capacitors for setting the time constant for smooth starting up operation, and so forth. Such regulators are expensive to manufacture and, because of their large size, are difficult to substitute for conventional domestic light switches.

In order to reduce the cost and size of such a regulator, it could be provided with most of its functions in digital form. However, digital circuits generally are very sensitive to parasitic pulses.

SUMMARY OF THE INVENTION

An object of the present invention is to provide a digital controlled power regulator that eliminates or reduces the problem associated with the parasitic pulses from the mains and requires a small number of external components.

This object and others of the invention are achieved with a power regulating process for a load connected to the mains through a controlled switch whose control is delayed by a selected time interval with respect to the time a mains synchronization pulse is provided. According to the invention, the process comprises the following steps: (a) detecting a synchronization pulse, which determines the start of a cycle, within a fixed time interval of the preceding cycle; (b) as soon as the synchronization pulse has been detected, waiting for the end of this fixed interval, then counting down a first time interval which practically substantially ends at a time corresponding to the arrival time of the synchronization pulse plus the selected time interval; (c) at the end of the first time interval, triggering the switch on and counting down a second time interval which ends before the normal arrival of the next synchronization pulse; and (d) at the end of the second time interval, counting down the fixed time interval within which the next synchronization pulse must be detected.

According to an embodiment of the invention, the second time interval starts with a third time interval equal to the nominal half-period of the mains, at the end of which the switch is also triggered on.

According to an embodiment of the invention, from step (b), the process comprises the following steps: measuring the remaining time elapsing between the arrival of the synchronization pulse and the end of the fixed time interval of the preceding cycle; calculating the difference between the remaining time and an average value of remaining times calculated on a predetermined number (K) of the preceding cycles; and, for the next cycle (n+1), correcting the first time interval with a determined fraction of the above difference and calculating the new average value.

According to an embodiment of the invention, the determined fraction equals the above difference divided by K.

According to an embodiment of the invention, the control of the switch is interrupted if a synchronization pulse has not arrived within the fixed time interval.

The present invention further provides a device for implementing the process according to the invention. The device mainly includes a microcontroller comprising: means for detecting synchronization pulses; means for storing the first and second time intervals, the fixed time interval, the remaining time, the selected time interval and the average value; means for adjusting the value of the selected time interval as a function of external control means, and for initializing the remaining time, the mean value and the first and second time intervals; a programmable counter in which are successively loaded and counted down at the rate of an internal clock the first and second time intervals and the fixed time interval, the state of the counter being read during the fixed time interval in order to provide the remaining time; and calculation means for calculating the mean value as a function of the remaining time variations, in order to adjust the value of the first time interval as a function of the selected time interval and average value, and to adjust the value of the second time interval as a function of the selected time interval.

The foregoing and other objects, features, aspects and advantages of the invention will become apparent from the following detailed description of the present invention which should be read in conjunction with the accompanying drawings.

DETAILED DESCRIPTION

Figure 1:
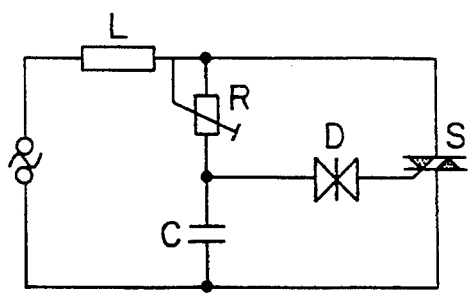
FIG. 1, above described, schematically shows a regulating circuit according to the prior art.
Figure 2:
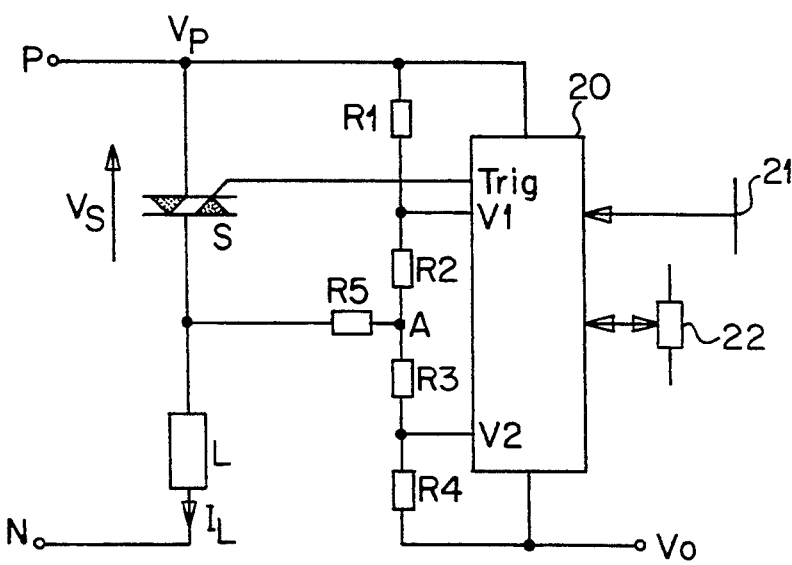
FIG. 2 shows an embodiment of a regulator according to the invention, using a microcontroller.

FIG. 2 shows a regulator implementing the method according to the invention. A load L is connected to the mains mid-point N and connected to a phase P of the mains through a triac S. The control circuit includes a suitably programmed microcontroller 20, a dividing bridge including four resistors, R1–R4, a resistor R5, a sensitive key 21 and/or a potentiometer 22.

The control circuit is supplied by the phase P of the mains which is at a voltage $V_p$ and by a voltage VO lower than $V_p$ by, for example, 5 volts. Voltage VO is obtained from the mains through a conventional circuit (not shown) including a capacitor and a zener diode.

The first (R1) and last (R4) resistors of the dividing bridge are connected to voltage $V_p$ and voltage VO, respectively. Resistor R5 has one terminal connected to the junction of the triac and load L and the other terminal connected to the junction A of resistors R2 and R3 of the dividing bridge.

The microcontroller 20, also fed by voltages $V_p$ and VO, receives a signal provided by a sensitive key 21, a signal provided by an optional potentiometer 22, and signals V1 and V2 respectively provided at the junction of resistors R1 and R2, and at the junction of resistors R3 and R4. The microcontroller provides a control signal Trig to triac S.

The role of resistors R1–R5, more particularly of signals V1 and V2, will be explained hereinafter.

Figure 3:
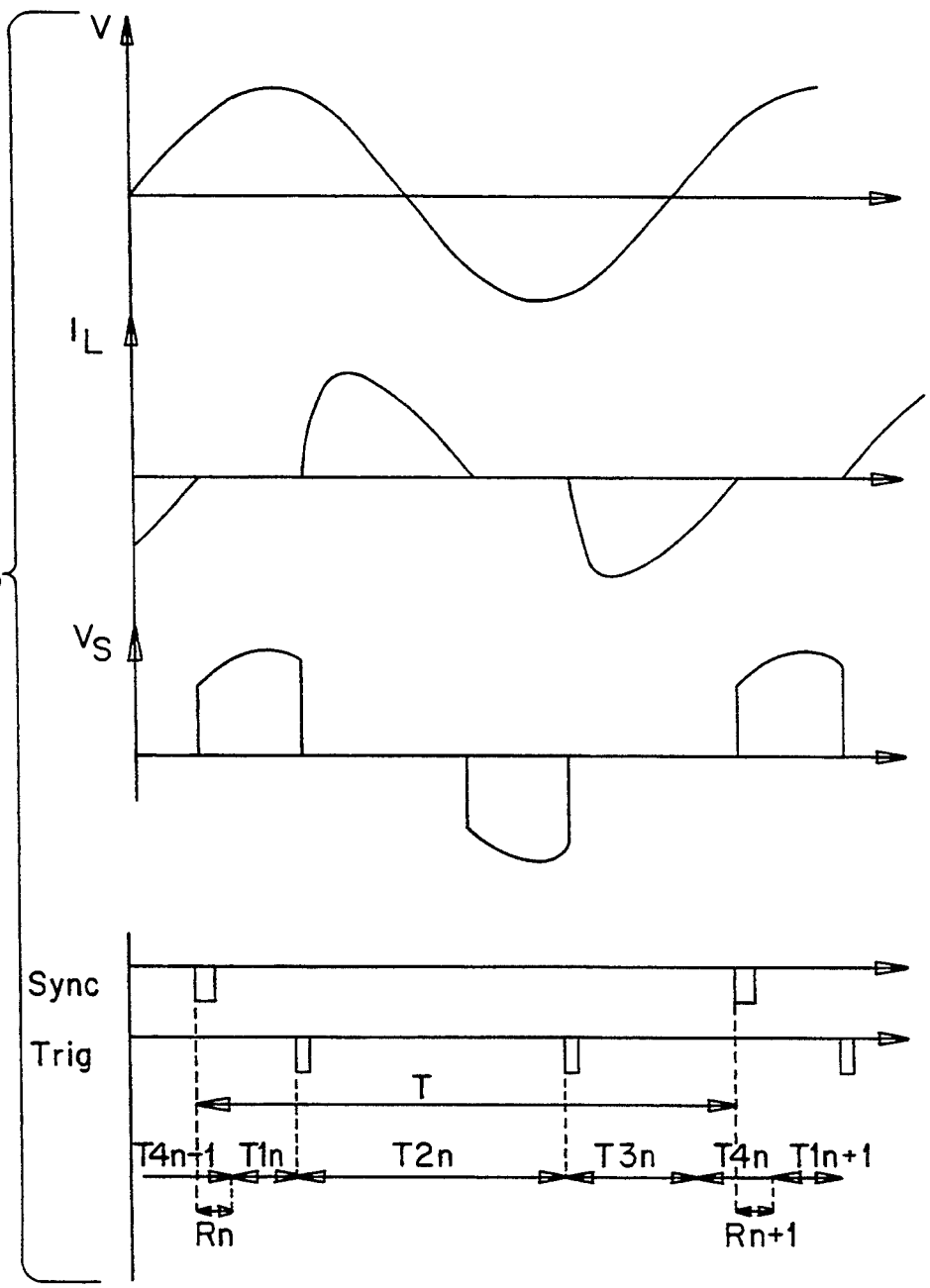
FIG. 3 shows waveforms of voltages and of a current both relating to power components of the regulator of FIG. 2, and synchronization and control signals used in the regulator.

FIG. 3 schematically shows the operation of the regulator according to the invention and more particularly of microcontroller 20 (which can be replaced with a wired logical circuit), allowing realization of the steps of the process according to the invention. FIG. 3 shows, for an operation cycle (n), voltage V of the mains, current $I_L$ through the load, voltage $V_S$ across triac S, the synchronization pulses Sync used in the microcontroller 20 and the triggering pulses Trig provided to the gate of triac S through the microcontroller.

It is assumed that, initially, the period of the mains is equal to its nominal value and that a synchronization pulse Sync is regularly provided at each period of the mains at the time of the zero crossings from a negative value of current $I_L$ in load L, in a manner described later on. Each pulse Sync determines the start up of a cycle.

Considering, during this initial period, a cycle n substantially corresponding to one period, this cycle is divided, according to the invention, into:

time intervals $R_n$ and $T1_n$ at the end of which a first triggering pulse Trig is provided; the time interval $R_n + T1_n$ is initially selected as a function of the control applied to microcontroller 20 so as to correspond to a value Td determined by the operator actuating the sensitive key 21 or potentiometer 22 to fix a desired phase-shift between the synchronization pulse and the triggering pulse;

a time interval $T2_n$ at the end of which is provided a second triggering pulse intended to determine a conduction state during the next half-period; the time interval $T2_n$ separating two triggering pulses is initially fixed by the microcontroller so as to correspond to the nominal half-period duration of the mains;

a time interval $T3_n$ at the end of which is initialized the counting down of a fixed time interval $T4_n$ during which the presence of the next synchronization pulse is looked for. The time interval $T3_n$ is selected so that the sum of the time intervals $R_n$, $T1_n$, $T2_n$ and $T3_n$ has a value slightly lower than the nominal period T. The time interval $T4_n$ is selected so that the sum of the time intervals $R_n$, $T1_n$, $T2_n$ $T3_n$ and $T4_n$ has a value slightly higher than the nominal period T.

Thus, the time interval $T3_n$ ends before the nominal end of the cycle, that is, before the normal arrival of the next synchronization pulse. The presence of the synchronization pulse is searched for the fixed time interval $T4_n$ and normally arrives at the end of a time interval $T4_n - R_O$ if no fluctuations of the mains occurred, $R_O$ being the initial value of intervals R. The arrival of the synchronization pulse initializes the next cycle.

The detection of the synchronization pulses during a time interval T4, short as compared to period T, provides the process with a reduced or minimal sensitivity to the mains fluctuations. Indeed, a parasitic pulse of current $I_L$, which would cause an erroneous synchronization pulse, has an influence only if it occurs during time interval T4, whereas such a parasitic pulse has no effect if it occurs during the time intervals T1, T2 or T3.

If the synchronization pulse is not provided during time interval $T4_n$, this causes an error and the triggering of the triac is interrupted. If a shifted or parasitic synchronization pulse occurs during a time interval $T4_{n-1}$, interval $R_n$ is different from $R_O$; so, the initial conditions are no longer complied with.

To ensure proper operation under conditions that are not the nominal conditions, the invention provides for measuring each time interval $R_{n-1}$ elapsing between the synchronization pulse occurrence and the end of the predetermined time interval $T4_{n-2}$, and to adjust the duration of the time interval $T1_n$ as a function of the measured value of the time interval $R_{n-1}$ in order to adapt triggering to possible slow shifts of the mains frequency. The adjustment is made so as to minimize the influence of parasitic pulses provided instead of the synchronization pulses during the time interval $T4_{n-2}$. To achieve this purpose, the adjustment of the value of the time interval $T1_n$ as a function of the measured time interval $R_{n-1}$ is performed by using a weighting factor in the measurement of time interval $R_n$ in order to average the effect of possible abrupt variations of this time interval $R_n$.

Indeed, it is desired that the phase-shift between the synchronization and triggering pulses follows slow variations of the mains period but does not follow the abrupt variations of the time interval $R_n$ caused by the occurrence of parasitic synchronization pulses.

Such parasitic pulses on the synchronization signal are liable to occur, for example, when a high frequency signal for remote-controlled electrical counters operating on a day/night mode is added to the mains voltage.

Thus, the invention provides for storage and updating a sliding mean value (termed $R'_n$) averaged on K cycles of values $R_n$ ($R_{n-k}$ to $R_n$). At each new cycle, $R_n$ is measured, and a correction factor $(R_n - R'_n)/K$ is determined. This factor is used to correct, on the one hand, value $R'_{n+1}$ and, on the other hand, the time interval $T1_{n+1}$ of the next cycle.

This recurrent correction can be expressed by the following equations:

$$T1_{n+1} = T1_n - (R_n - R'_n)/K;$$

$$R'_{n+1} = R'_n + (R_n - R'_n)/K.$$

Hence, the regulator according to the invention is practically insensitive to occasional or random parasitic pulses but is adapted to respond to mains frequency shifts.

By way of example, for a 50-Hz mains frequency, the following initial values can be selected:

$R_O = 0.5$ ms;
Td = value fixed by the operator;
T2 = 10 ms;
T3 = 9 ms − Td;
T4 = 1.5 ms; and
K = 16.

Of course, these values can be optimized to meet specific requirements and can be adapted to different mains frequencies.

The invention also provides a specific operation mode for obtaining synchronization pulses. One takes advantage of voltage $V_S$ across triac S through the above mentioned resistors R1–R5, which are calculated to ensure the following operation.

If current $I_L$ in triac S is non-zero, then voltage $V_S$ is practically zero. Signal V1 between resistors R1 and R2 is at a logic level 1, and signal V2 between resistors R3 and R4 is as a logic level 0. Thus, signal V1 is 1 and signal V2 is 0.

If current $I_L$ is zero, the mains voltage is present across the triac. If the mains voltage is positive, point A is at a voltage lower than voltage VO; signal V1 is then at a logic level 0. Thus, signals V1 and V2 are both 0.

During a negative half-period of the mains voltage, point A is at a voltage higher than voltage $V_p$ of phase P; signal V2 is then at a logic level 1. Thus, signals V1 and V2 are both 1.

In order to detect the zero crossing of the current from a negative value, the transition times from (V1=1, V2=0) to (V1=0, V2=0) have to be detected. This is performed by the microcontroller 20 to provide synchronization pulses.

Figure 4:
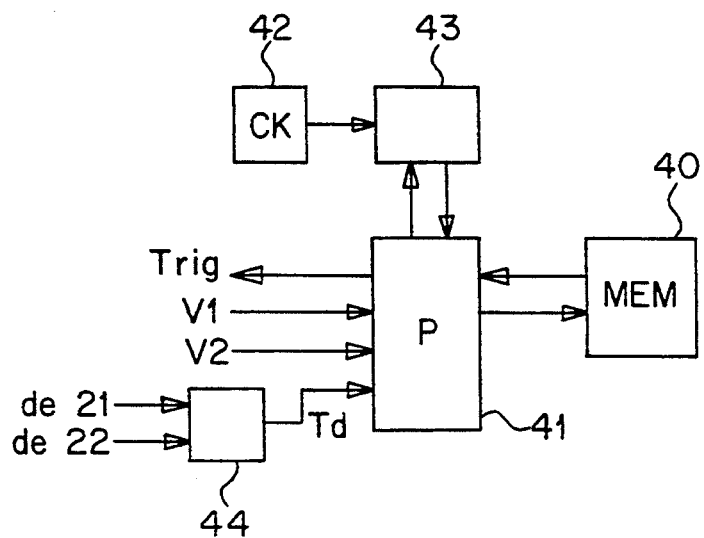
FIG. 4 schematically shows the main components of the microcontroller used in the circuit of FIG. 2.

FIG. 4 schematically shows the microcontroller 20. The process according to the invention can be implemented with a simple microcontroller having a small-size memory including memory 40, management and calculation means or microprocessor 41, a clock 42 and a single programmable counter 43. The various values T1, T2, T3, T4, R and R' are initialized and stored in suitable memory locations. Value Td is obtained by means of an interface circuit 44 which receives signals from key 21 or potentiometer 22, and is then loaded.

According to the invention, the time intervals $T1_n$, $T2_n$, $T3_n$ and $T4_n$, which are sequentially counted down by clock 42, are successively loaded in the programmable counter 43. At the end of each time interval $T1_n$ and $T2_n$, a triggering pulse turns on triac S. At the end of the time interval $T3_n$, during the time interval $T4_n$, the synchronization pulse detection is enabled. After the arrival of the synchronization pulse, time interval $R_{n+1}$ is stored. Time interval $R_{n+1}$ corresponds to time interval $T4_n$ minus the time elapsed since the start up of the loading of time interval $T4_n$ in counter 43. The microprocessor 41 included in the microcontroller ensures sequencing of these operations and the calculation of the new value of $T1_{n+1}$ associated with the variations of $R_n$ and $R'_n$ as follows.

As soon as a synchronization pulse is detected, value $R_{n-1}$ is replaced with the new value $R_n$ in a memory location. In another memory location, value $R'_n$ is replaced with the new value $R'_{n+1} = R'_n + (R_n - R'_n)/K$.

Lastly, in another memory location, value $T1_n$ is replaced with the new value $T1_{n+1} = Td - R'_{n+1}$.

The process according to the invention has been described in relation with a mains period. Of course, this process can be adapted to operate at the rate of mains half-period by also providing synchronization pulses at the zero crossings of current $I_L$ from a positive value and by eliminating the time interval T2.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

What is claimed is:

1. A method for regulating power in a load connected to a mains through a controlled switch having control delayed by a selected time interval with respect to a time at which a mains synchronization pulse is provided, comprising the steps of:
   (a) detecting a synchronization pulse that determines the start of a cycle within a fixed time interval of a preceding cycle;
   (b) as soon as said synchronization pulse has been detected, waiting for an end of the fixed interval, then counting down a first time interval that ends at a time substantially corresponding to an arrival time of the synchronization pulse plus the selected time interval;
   (c) at the end of the first time interval, triggering the switch on and counting down a second time interval that ends before a normal arrival of a next synchronization pulse; and
   (d) at the end of the second time interval, counting down the fixed time interval within which the next synchronization pulse must be detected.

2. The method of claim 1, wherein said second time interval starts with a third time interval having a duration of a nominal half-period of the mains, at the end of which an on state of the switch is also triggered.

3. The method of claim 1, further comprising, between steps (b) and (c), the following steps:
   measuring a remaining time elapsing between an arrival of the synchronization pulse and the end of the fixed time interval of the preceding cycle;
   calculating a difference between the remaining time and a remaining time average calculated from a predetermined number of preceding cycles; and
   for the next cycle, correcting the first time interval with a predetermined fraction of the difference and calculating a new average value.

4. The method of claim 3, wherein the predetermined fraction equals the difference divided by a predetermined number.

5. The method of claim 1, wherein control of the switch is interrupted if a synchronization pulse has not arrived within the fixed time interval.

6. A device, including a microcontroller, for regulating power in a load connected to a mains through a controlled switch, comprising:
   means for detecting synchronization pulses;

means for storing first and second time intervals, a fixed time interval, a remaining time, a selected time interval and an average value;

means for adjusting a value of the selected time interval as a function of external control means, and for initializing the remaining time, the average value and said first and second time intervals;

a programmable counter in which are successively loaded and counted down at the rate of an interval clock the first and second time intervals and the fixed time interval, the state of the counter being read during said fixed time interval in order to provide the remaining time; and calculation means for calculating the average value as a function of the variations of the remaining time, in order to adjust the value of the first time interval as a function of the selected time interval and average value, and to adjust a value of the second time interval as a function of the selected time interval.

7. A method for regulating power in a load coupled to an alternating current power supply by a controlled switch that is responsive to a trigger signal wherein the trigger signal is delayed with respect to a synchronization pulse by a selected time interval, comprising the steps of:

(a) detecting the synchronization pulse within a fixed time interval after a preceding cycle;

(b) in response to detection of the synchronization pulse, waiting until an end of the fixed time interval, then counting down a first time interval that ends at a time substantially corresponding to an arrival time of the synchronization pulse plus the selected time interval;

(c) providing the trigger signal at the end of the first time interval;

(d) counting down a second time interval that ends at a time before a normal arrival time of a subsequent synchronization pulse; and (e) at the end of the second time interval, counting down the fixed time interval while waiting to detect the subsequent synchronization pulse.

8. The method of claim 7, wherein the second time interval begins with a third time interval having a duration substantially corresponding to a duration of a nominal half-period of the alternating current power supply, and further includes the step of providing the trigger signal at an end of the third time interval.

9. The method of claim 7, further comprising, between steps (b) and (c), the following steps:

measuring a time interval between detection of the synchronization pulse and the end of the fixed time interval of the preceding cycle;

calculating a difference between the time interval and an average time interval calculated from a number of preceding cycles; and modifying, for a subsequent cycle, a duration of the first time interval by a fraction of the difference and calculating a new average time interval.

10. The method of claim 9, wherein the step of modifying a duration of the first time interval by a fraction of the difference includes using a fraction substantially equal to the difference divided by a predetermined value.

11. The method of claim 7, further comprising the step of interrupting control of the controlled switch if a synchronization pulse is not detected within the fixed time interval.

12. A control circuit for regulating power supplied to a load through a controlled switch responsive to a trigger signal and coupled to an alternating current power supply, comprising:

a detection circuit detecting a synchronization pulse within a fixed time interval after a preceding cycle;

a counter circuit, controlled by a control circuit responsive to the detecting circuit, counting down a first time interval that ends at a time substantially corresponding to an arrival time of the synchronization pulse plus a selected time interval substantially corresponding to a delay time between the synchronization pulse and the trigger signal, wherein the control circuit controls the counter circuit to begin counting at an end of the fixed time interval, and wherein the counter circuit, subsequent to counting down the first time interval, counts down a second time interval that ends at a time prior to a normal arrival time of a subsequent synchronization pulse; and a trigger circuit, responsive to the control circuit and the counter circuit, providing the trigger signal when the first counter reaches a zero count.

13. The circuit of claim 12, wherein the control circuit additionally controls the trigger circuit to provide the trigger signal at an end of a third time interval having a duration substantially equal to a nominal half-period of the alternating current power supply.

14. The circuit of claim 12, wherein the control circuit further comprises:

a measuring circuit measuring a time interval between detection of the synchronization pulse and the end of the fixed time interval of the preceding cycle;

a calculator circuit calculating a difference between the time interval and an average time interval calculated from a number of preceding cycles; and an adjusting circuit adjusting, for a subsequent cycle, a duration of the first time interval by a fraction of the difference and calculating a new average time interval.

15. The circuit of claim 14, wherein the adjusting circuit adjusts the first time interval using a fraction substantially equal to the difference divided by a predetermined value.

16. The circuit of claim 12, wherein the control circuit interrupts control of the controlled switch if a synchronization pulse is not detected within the fixed time interval.

17. The circuit of claim 14, further comprising a circuit for changing a value of the selected time interval in response to external control input and for initializing the time interval between detection of the synchronization pulse and the end of the fixed time interval of the preceding cycle, the average time interval, the first time interval, and the second time interval.

18. The circuit of claim 17, wherein the counter circuit includes a programmable counter.

19. The circuit of claim 18, wherein the control circuit includes a microcontroller.

20. The circuit of claim 19, further comprising a memory storing the first and second time intervals, the fixed time interval, the selected time interval, the average time interval, and the time interval between detection of the synchronization pulse and the end of the fixed time interval.

* * * * *